(12) United States Patent
Pardini

(10) Patent No.: US 9,279,197 B2
(45) Date of Patent: Mar. 8, 2016

(54) SPANDEX WITH HIGH UNIFORMITY

(75) Inventor: Steven P. Pardini, Harrisonburg, VA (US)

(73) Assignee: INVISTA North America S.a.r.l., Wilimington, DE (US)

( * ) Notice: Subject to any disclaimer, the term of this patent is extended or adjusted under 35 U.S.C. 154(b) by 480 days.

(21) Appl. No.: 13/521,883

(22) PCT Filed: Jan. 5, 2011

(86) PCT No.: PCT/US2011/020216
§ 371 (c)(1),
(2), (4) Date: Jul. 26, 2012

(87) PCT Pub. No.: WO2011/087943
PCT Pub. Date: Jul. 21, 2011

(65) Prior Publication Data
US 2012/0295506 A1 Nov. 22, 2012

Related U.S. Application Data

(60) Provisional application No. 61/294,935, filed on Jan. 14, 2010.

(51) Int. Cl.
| | |
|---|---|
| C08G 18/00 | (2006.01) |
| C08G 18/08 | (2006.01) |
| C08G 18/10 | (2006.01) |
| C08G 18/28 | (2006.01) |
| C08G 18/30 | (2006.01) |
| C08G 18/32 | (2006.01) |
| C08G 18/60 | (2006.01) |
| C08J 5/00 | (2006.01) |
| C08L 75/00 | (2006.01) |
| D01F 6/00 | (2006.01) |
| D03D 9/00 | (2006.01) |
| D03D 13/00 | (2006.01) |
| D03D 15/00 | (2006.01) |
| D03D 15/08 | (2006.01) |
| D03D 17/00 | (2006.01) |
| D03D 19/00 | (2006.01) |
| D04B 1/18 | (2006.01) |
| D04B 1/22 | (2006.01) |
| D04B 7/16 | (2006.01) |
| D04B 7/24 | (2006.01) |
| D04B 9/24 | (2006.01) |
| D04B 11/12 | (2006.01) |
| D04B 21/14 | (2006.01) |
| D04B 21/20 | (2006.01) |
| D01F 6/70 | (2006.01) |
| D01F 6/72 | (2006.01) |

(52) U.S. Cl.
CPC ...... *D01F 6/70* (2013.01); *C08G 18/10* (2013.01); *C08G 18/2865* (2013.01); *C08G 18/3228* (2013.01); *D01F 6/72* (2013.01); *Y10T 442/40* (2015.04)

(58) Field of Classification Search
CPC .............. C08G 18/10; C08G 18/2865; C08G 18/3228; D01F 6/70; D01F 6/72; Y10T 442/40
USPC .............. 264/205, 331.19; 442/49, 182, 203, 442/301, 306, 312; 524/589, 590; 528/444, 528/59, 61, 65, 66, 68, 85, 44
See application file for complete search history.

(56) References Cited

U.S. PATENT DOCUMENTS

| | | |
|---|---|---|
| 5,907,012 A | 5/1999 | Voss et al. |
| 6,503,996 B1 | 1/2003 | Bretches et al. |
| 2008/0004395 A1 | 1/2008 | Covelli et al. |

FOREIGN PATENT DOCUMENTS

WO    WO2009061020    5/2009

OTHER PUBLICATIONS

S. Siggia, "Quantitative Organic Analysis via Functional Group", 1963, pp. 559-561, 3rd Edition, Wiley & Sons, New York.

*Primary Examiner* — Patrick Niland
(74) *Attorney, Agent, or Firm* — Bridget Sciamanna

(57) ABSTRACT

Disclosed herein are a highly uniform spandex and process for making such spandex. More particularly, the polyurethaneurea of which such spandex is prepared has both dialkylurea and cycloalkylurea ends, wherein a chain terminator composition includes a dialkylamine such as diethylamine and a cylcoalkylamine such as cyclohexylamine.

13 Claims, No Drawings

SPANDEX WITH HIGH UNIFORMITY

BACKGROUND OF THE INVENTION

1. Field of the Invention

The disclosure relates to a highly uniform spandex and to a process for making such spandex. More particularly, the polyurethaneurea of which such spandex is prepared has both dialkylurea and cycloalkylurea ends, wherein a chain terminator composition includes a dialkylamine such as diethylamine and a cylcoalkylamine such as cyclohexylamine.

2. Description of the Related Art

U.S. Pat. No. 6,503,996 discloses a spandex composition having high uniformity. This composition includes alkylurethane ends from a monoalcohol chain terminator and a monoalkylurea chain terminator. The monoalcohol must be added to the polyol and isocyanate during the preparation of the capped glycol, rather than with the monoalkylurea chain terminator due to the relative rates of reaction.

SUMMARY OF THE INVENTION

In some aspects are a spandex having high uniformity which is especially useful for warp-knitting or high content weft-knitting (including circular knitting). Included is an article including at least one spandex fiber or yarn including a polyurethaneurea which is the reaction product of:
(a) a capped glycol comprising the reaction product of
  (i) a polyol selected from the group consisting of a polyether polyol, a polyester polyol, a polycarbonate polyol, and combinations thereof; and
  (ii) a diisocyanate;
(b) a chain extender comprising at least a first diamine and a second diamine; and
(c) a chain terminator composition comprising monofunctional amine including cyclohexylamine;
wherein said polyurethaneurea comprises a mole ratio of the first diamine to the second diamine of about 75:25 to about 85:15; and cyclohexylurea ends of about 10 meq/Kg to about 30 meq/Kg.

Also provided is a process for making spandex including of:
(a) providing a polyol selected from the group consisting of a polyether polyol, a polyester polyol, a polycarbonate polyol, and combinations thereof;
(b) providing a diisocyanate;
(c) contacting the polyol and diisocyanate to form a capped glycol;
(d) providing a chain extender comprising at least a first diamine and a second diamine;
(e) providing a chain terminator composition comprising monofunctional amine including cyclohexylamine;
(f) contacting the capped glycol, the chain extender and the chain terminator composition in a solvent to form a polyurethaneurea in solution; and
(g) spinning the polyurethaneurea in solution to form the spandex,
wherein said polyurethaneurea comprises a ratio of the first diamine to the second diamine of about 75:25 to about 85:15; and cyclohexylurea ends of about 10 meq/Kg to about 30 meq/Kg.

DETAILED DESCRIPTION OF THE INVENTION

Spandex having high fiber uniformity have been prepared with the polyurethaneurea compositions of some aspects. The polyurethaneurea compositions Include a chain extender compositions that includes a blend or mixture of two or more chain extenders such as diamine chain extenders and a chain terminator composition that includes cyclohexylamine.

The term "solution-spinning" as used herein includes the preparation of a fiber from a solution which can be either a wet-spun or dry-spun process, both of which are common techniques for fiber production.

Polyurethaneureas which have been chain-terminated with an aliphatic primary amine have monoalkylurea ends, for example cyclohexylamine as chain terminator will provide cyclohexylurea ends. Chain termination with (secondary) dialkylamines gives dialkyl urea ends. Amine ends in the polyurethaneurea are derived from incompletely reacted diamine chain extender. The spandex of some aspects can have about 10 meq/Kg to about 60 meq/Kg, including about 10 meq/Kg to about 40 meq/Kg of diethylurea ends, such as about 22 meq/Kg to about 26 meq/Kg, about 10 meq/Kg to about 30 meq/Kg cyclohexylurea ends, such as about 16 meq/Kg to about 20 meq/Kg, and about 12 meq/Kg to about 24 meq/Kg primary amine ends, such as about 16 meq/Kg to about 20 meq/Kg. (All measurements of meq/Kg are based on polymer solids).

Polyurethaneurea compositions useful for preparing fiber or long chain synthetic polymers that include at least 85% by weight of a segmented polyurethane and are also referred to as spandex. Typically, these include a polymeric glycol which is reacted with a diisocyanate to form an NCO-terminated prepolymer (a "capped glycol"), which is then dissolved in a suitable solvent, such as dimethylacetamide, dimethylformamide, or N-methylpyrrolidone, and secondarily reacted with a difunctional chain extender. Polyurethanes are formed in a second step when the chain extenders are diols (and may be prepared without solvent). Polyurethaneureas, a sub-class of polyurethanes, are formed when the chain extenders are diamines. In the preparation of a polyurethaneurea polymer which can be spun into spandex, the glycols are extended by sequential reaction of the hydroxy end groups with diisocyanates and one or more diamines. In each case, the glycols must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

Suitable polyol or polymeric glycol components include polyether glycols, polycarbonate glycols, and polyester glycols of number average molecular weight of about 600 to about 3,500, including about 1600 to about 2200, and about 1800. Mixtures of two or more polymeric glycol or copolymers can be included.

Examples of polyether glycols that can be used include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol, 1,6-hexanediol, 2,2-dimethyl-1,3 propanediol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred, and a poly(tetramethylene ether) glycol of molecular weight of about 1,700 to about 2,100, such as Terathane® 1800 (INVISTA of Wichita, Kans.) with a functionality of 2, is one example of a specific suitable glycols. Co-polymers can include poly(tetramethylene-co-ethyleneether) glycol.

Examples of polyester polyols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol with a melting temperature of about 5° C. to about 50° C. is an example of a specific polyester polyol.

Examples of polycarbonate polyols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is an example of a specific polycarbonate polyol.

The spandex yarns and fibers prepared from the polyurethaneurea compositions of some aspects may have a coefficient of denier variation (CDV) which is lower than that of spandex including dialkylurea and amine ends. Such a reduction in coefficient of denier variation is significant. The spandex CDV may vary depending on the denier of the fiber or yarn. For example, the CDV may be about 20 or less. For a yarn having 20 denier, CDV may be about 18, for a yarn having 30 denier, the CDV may be about 15, for yarn having 40 denier, the CDV may be about 14.

The process of some aspects includes contacting a polymeric glycol and a diisocyanate to form a capped glycol. The capped glycol is contacted with at least a first diamine chain extender and a second diamine chain extender which may be provided by a blend or mixture and a chain terminator composition that includes a monofunctional amine such as cyclohexylamine in a solvent, and solution spinning the resulting solution of polyurethaneurea to form the spandex.

The diisocyanate component can also include a single diisocyanate or a mixture of different diisocyanates including an isomer mixture of diphenylmethane diisocyanate (MDI) containing 4,4'-methylene bis(phenyl isocyanate) and 2,4'-methylene bis(phenyl isocyanate). When an isomer mixture of MDI is used, the ratio of the 4,4' isomer to the 2,4' isomer may be about 100:0 to about 50:50, including about 98:2 to about 88:12, about 70:30 and about 60:40. Any suitable aromatic or aliphatic diisocyanate can be included in combination with the 4,4' isomer of MDI where the 4,4'_MDI is the predominant component. Examples of diisocyanates that can be used include, but are not limited to, 4,4'-methylene bis (phenyl isocyanate), 2,4'-methylene bis(phenyl isocyanate), 4,4'-methylenebis(cyclohexyl isocyanate), 1,3-diisocyanato-4-methyl-benzene, 2,2'-toluenediisocyanate, 2,4'-toluenediisocyanate, 5-isocyanato-1-(isocyanatomethyl)-1,3,3-trimethylcyclohexane, 1,6-diisocyanatohexane, 2,2-bis(4-socyanatophenyl)-propane, 1,1'-methylenebis(4-isocyanatocyclohexane), 1,4-diisocyanato-cyclohexane, 1,4-bis(4-isocyanato-α,α-imethylbenzyl)benzene, 1-isocyanato-2-[(4'-isocyanato-phenyl)methyl]benzene, and mixtures thereof. Examples of specific polyisocyanate components include Mondur® ML (Bayer), Lupranate® MI (BASF), and Isonate® 50 O, P' (Dow Chemical), and combinations thereof.

Generally, the NCO moiety content in the capped glycol can be about 2 to 6 weight percent, including about 2.3 to about 3.0, about 2.5 to about 2.7.

For solution-spinning, the capped glycol can be dissolved in a suitable solvent, for example dimethylacetamide ("DMAc"), N-methylpyrrolidone, or dimethylformamide. Optionally, the capping step can be carried out in a solvent, for example dimethylacetamide containing less than about 50 ppm water and less than about 2000 ppm combined formamides and amines, based on solvent weight.

The diamine chain extender composition includes at least a first diamine and a second diamine which may be blended or mixed together or added separately to contact the capped glycol. Suitable diamines include those having 2-12 carbons, for example ethylene diamine, 1,3-butanediamine, 1,4-butanediamine, 1,3-diamino-2,2-dimethylbutane, 1,6-hexanediamine, 1,2-propanediamine, 1,3-propanediamine, N-methylaminobis(3-propylamine), 2-methyl-1,5-pentanediamine, 1,5-diaminopentane, 1,3-diamino-4-methylcyclohexane, 1,3-cyclohexanediamine, 1,1'-methylene-bis(4,4'-diaminohexane), 3-minomethyl-3,5,5-trimethylcyclohexane, 1,3-diaminopentane, and mixtures thereof.

The weight ratio of the first diamine to the second diamine may be about 75:25 to about 85:15, including about 80:20.

In one aspect, the first diamine may be ethylene diamine and the second diamine, such as 2-methyl-1,5-pentamethylenediame (MPMD), or additional diamines could be considered 'coextenders'.

The chain terminator composition includes cyclohexylamine and may also be combined with other suitable chain terminators such as monoamine chain terminators having 5-12 carbons, such as 6-7 carbons, for example n-pentylamine, n-hexylamine, n-heptylamine, methylcyclohexylamines (for example 1-amino-3-methylcylohexane, 1-amino-2-methylcyclohexane, and 1-amino-3,3,5-trimethylcyclohexane), n-dodecylamine, 2-aminonorbornane, 1-adamantanamine, unsymmetrical dimethyl hydrazine (UDMH), and mixtures thereof. The monoamine can be used in an amount of at least about 2 meq/kg and at most about 55 meq/kg, based on total weight of the polymer components.

The intrinsic viscosity of the polyurethaneurea of which the spandex is prepared and spun in the process of some aspects can be about 0.90 to about 1.20 dl/g, including about 0.95 to about 1.10 dl/g.

Optionally, the polymeric glycol can contain acids and acid-producing compounds, which can be added before the capping step, for example phosphoric acid, benzenesulfonic acid, p-toluenesulfonic acid, sulfuric acid, carboxylic acid chlorides and anhydrides as well as phosphoric acid esters, and the like. The acid or acid-producing compound can be used in an amount of at least about 10 and at most about 125 parts per million ("ppm") based on polymeric glycol weight. Phosphoric acid is useful due to its low corrosivity.

A variety of other additives can also be used in the spandex and the process of some aspects in any suitable amount to achieve a desired property. Examples include delustrants such as titanium dioxide in any suitable amount such as about 0.05% to about 0.5% based on the weight of the polymer; stabilizers such as hydrotalcite, mixtures of huntite and hydromagnesite (in any suitable amount for example at 0.25% to 5.0% based on the weight of the polymer), barium sulfate, hindered amine light stabilizers, UV screeners, hindered phenols, and zinc oxide; dyes and dye enhancers; and the like.

Diethylenetriamine can optionally be used, in the chain extension step, at low levels for solution viscosity control. When Diethylenetriamine is included, suitable amounts include greater than 0 to about 500 ppm or great than 0 to about 125 ppm, greater than 0 to about 250 ppm, about 50 ppm to about 250 ppm, including about 50 ppm to about 125 ppm (based on weight of polymer).

Polyurethaneurea solution viscosity is determined in accordance with the general method of ASTM 01343-69 with a Model DV-8 Falling Ball Viscometer (Duratech Corp., Waynesboro, Va.), operated at 40° C. and is reported in poise. The highest solution viscosity that could be measured with this instrument was 35,000 poise.

To measure coefficient of denier variation ('CDV'), the first 50 meters of fiber at the surface of a wound spandex package are removed so that inaccuracies resulting from handling damage are avoided. Spandex is then removed for 130 seconds from the package using a rolling take-off and fed across a tensiometer comprising a piezoelectric ceramic pin. The take-up roll's circumference is 50% greater than the feed roll's circumference, and the feed and take-up rolls rotated at the same rpm, so that the polyurethane fiber is stretched to 50% elongation across the tensiometer. The tensiometer measured the tension as the spandex is fed through the rolls. The standard deviation of the tension is divided by the average tension to obtain the coefficient of variation, which is reported as CDV, since denier is directly proportional to the tension. CDV is independent of the linear density units used (denier vs. decitex), and low CDV indicates high fiber uniformity.

The total isocyanate moiety content of the capped glycol (weight percent NCO) is measured by the method of S. Siggia, "Quantitative Organic Analysis via Functional Group", 3rd Edition, Wiley & Sons, New York, pp. 559-561 (1963).

The strength and elastic properties of the spandex are measured in accordance with the general method of ASTM D2731-72. Three filaments, a 2-inch (5-cm) gauge length and a zero-to-300% elongation cycle are used for each of the measurements. The samples are cycled five times at a constant elongation rate of 50 cm per minute using an Instron tensile tester. Load power ("LP"), the stress on the spandex during initial extension, is measured on the first cycle at 200% extension. Unload power ("UP") is measured at an extension of 200% on the fifth unload cycle. Percent elongation at break ("% ELO") and tenacity at break ("TEN") are measured on a sixth extension. Tenacity at break, load power and unload power are reported in centi-Newtons (CN). Percent set is also measured on samples that have been subjected to five 0-300% elongation/relaxation cycles. The percent set ("% S") is calculated as % S=100($L_f$−$L_o$)/$L_o$, wherein $L_o$ and $L_f$ are respectively the filament (yarn) length, when held straight without tension, before and after the five elongation/relaxation cycles.

Intrinsic viscosity ("IV") of the polyurethaneurea are determined by comparing the viscosity of a dilute solution of the polymer in DMAc to that of DMAc itself at 25° C. ("relative viscosity" method) in a standard Cannon-Fenske viscometer tube according to ASTM D2515 and is reported as dl/g.

"Meq/kg" refers to milliequivalents of the stated component per kilogram of total components, i.e. polymer solids.

The yarns of some aspects can have the following properties:

| Property | 40 den | 30 den | 20 den |
|---|---|---|---|
| LP (cN) | 6.5 | 5.0 | 3.5 |
| UP (cN) | 1.05 | 0.75 | 0.50 |
| ELO (%) | 450 | 460 | 440 |
| TEN (cN) | 40 | 30 | 23 |
| CDV | 14 | 15 | 18 |
| PR (%) | 11 | 10 | 13 |

The invention claimed is:

1. An article comprising at least one spandex fiber comprising a polyurethaneurea which is the reaction product of:
   (a) a NCO-terminated prepolymer comprising the reaction product of
      (i) a polyolmeric glycol selected from the group consisting of a polyether glyol, a polyester polyol, a polycarbonate glycol, and combinations thereof; and
      (ii) a diisocyanate;
   (b) a chain extender comprising at least a first diamine and a second diamine; and
   (c) a chain terminator composition including cyclohexylamine and diethylamine;
   wherein said polyurethaneurea comprises a mole ratio of said first diamine to said second diamine of about 75:25 to about 85:15; and diethylurea ends of about 10 meq/Kg to about 60 meq/Kg.

2. The article of claim 1, wherein said polyurethaneurea comprises diethylurea ends of about 12 meq/Kg to about 24 meq/Kg.

3. The article of claim 1, wherein said polyurethaneurea comprises a viscosity stabilizer.

4. The article of claim 3, wherein said viscosity stabilizer is present in an amount of about 50 ppm to about 250 ppm.

5. The article of claim 1, wherein first diamine comprises ethylenediamine and said second diamine comprises 2-methyl-1,5-pentamethylenediamine (MPMD).

6. The article of claim 1, wherein said polymeric glycol has a number average molecular weight of 1600 to about 2200.

7. The article of claim 1, wherein said NCO-terminated prepolymer has %NCO from about 2.3 to about 3.0.

8. The article of claim 1, wherein said NCO-terminated prepolymer has %NCO from about 2.5 to about 2.7.

9. The article of claim 1, wherein said polymeric glycol comprises polytetramethyleneether glycol.

10. The article of claim 1, wherein said diisocyanate comprises a diphenylmethane diisocyanate (MDI).

11. The article of claim 1, wherein said article is a knit.

12. The article of claim 11, wherein said knit is selected from warp knit and circular knit.

13. a process for making spandex including of:
   (a) providing a polymeric glycol selected from the group consisting of a polyether glycol, a polyester glycol, a polycarbonate glycol, and combinations thereof;
   (b) providing a diisocyanate;
   (c) contacting the polymeric glycol and diisocyanate to form a NCO-terminated prepolymer;
   (d) providing a chain extender comprising at least a first diamine and a second diamine;
   (e) providing a chain terminator composition including cyclohexylamine and diethylamine;
   (f) contacting the NCO-terminated prepolymer glycol, the chain extender and the chain terminator composition in a solvent to form a polyurethaneurea in solution; and (g) spinning the polyurethaneurea in solution to form the spandex,
wherein said polyurethaneurea comprises a mole ratio of said first diamine to said second diamine of about 75:25 to about 85:15; and diethylurea ends of about 10 meq/Kg to about 60 meq/Kg.

* * * * *